United States Patent [19]

Rosendahl et al.

[11] 3,879,351

[45] Apr. 22, 1975

[54] FLAME-RESISTANT HIGH MOLECULAR WEIGHT LINEAR POLYESTERS

[76] Inventors: Friedrich-Karl Rosendahl; Herbert Pelousek, both of Bayer Aktiengesellschaft, Dormagen; Hans Niederprüm, Bayer Aktiengesellschaft, Leverkusen, all of Germany

[22] Filed: Apr. 19, 1974

[21] Appl. No.: 462,496

[30] Foreign Application Priority Data
Apr. 19, 1973 Germany............................ 2320006

[52] U.S. Cl.......................... 260/75 N; 260/DIG. 24
[51] Int. Cl............................................. C08g 17/08
[58] Field of Search.................... 260/75 N, 75 H

[56] References Cited
UNITED STATES PATENTS
3,217,035  11/1965  Lazerte et al...................... 260/556
3,321,445  5/1967  Lazerte et al........................ 260/75

OTHER PUBLICATIONS

Niederpruem et al., Justus Liebigs Ann. Chem., 1973, (1), 11–19.

*Primary Examiner*—Melvin Goldstein
*Assistant Examiner*—N. Harkaway
*Attorney, Agent, or Firm*—Plumley & Tyner

[57] ABSTRACT

Flame-resistant high molecular weight linear polyesters which are eminently suitable for the production of filaments and fibers, obtained by polycondensation of a dicarboxylic acid and a glycol together with a dihydroxy perfluorinated aliphatic sulfonamide.

8 Claims, No Drawings

FLAME-RESISTANT HIGH MOLECULAR WEIGHT LINEAR POLYESTERS

This invention relates to flame-resistant high molecular weight linear polyesters in which certain perfluorinated sulphonamide compounds have been incorporated, by condensation, as flame-retarding agents.

It is known that the flammability and combustibility of formed products, e.g. filaments and fibres, produced from high molecular weight linear polyesters may be reduced by adding certain flame-retarding substances to the polyesters, for example antimony trioxide, phosphorus-containing compounds and organic chloro or bromo compounds. The flame-retarding action of these substances was, in many cases, insufficient; in addition, it was found that, when formed products, e.g. filaments, are produced from polyesters which contain organic chloro or bromo compounds as flame-retarding additives, hydrogen chloride or hydrogen bromide is split off, thus initiating degradation processes which have a marked undesirable influence on the properties of the filaments.

In addition, additives of this kind are easily removed from textiles produced from these fibres by subsequent treatment such as washing.

It is an object of this invention to produce flame-resistant high molecular weight polyesters that do not show the disadvantages mentioned above.

It is another object of this invention to produce such flame-resistant polyesters that show a higher degree of whiteness. Further objects will be evident from the following description and from the examples.

These objects are accomplished by incorporating certain perfluorinated aliphatic sulphonamides by condensation into the polyesters as flame-retarding agents.

In other words these objects are accomplished by a high molecular weight linear polyester, comprising in polycondensed form 0.1 to 15 percent by weight of a compound of the general formula

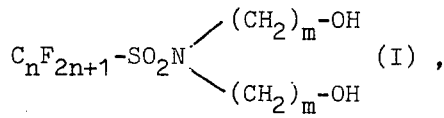

wherein
n represents an integer of from 1 to 10 and
m represents an integer of from 2 to 10.

These flame-resistant high molecular weight linear polyesters comprise within the polyester chain 0.1 to 15 percent by weight of structural units of the general formula

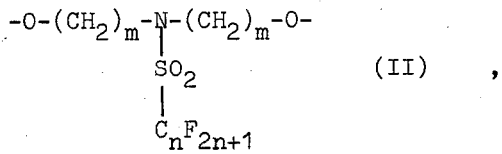

wherein
n represents an integer of from 1 to 10 and
m represents an integer of from 2 to 10, preferably, the high molecular weight linear polyesters of the present invention consist essentially of the structural units

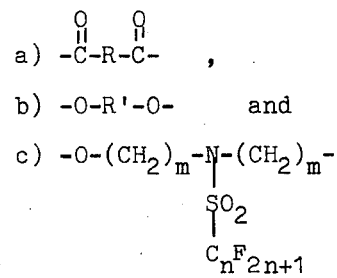

wherein the stoichiometric amount of said units b) and c) is equivalent to the stoichiometric amount of said units a), and wherein the amount of said units c) is 0.1 to 15 percent by weight of said polyester, and wherein R represents

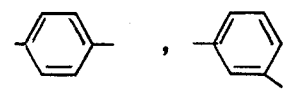

or a mixture thereof, R' represents the radical of a glycol without the OH groups,
n represents an integer of from 1 to 10 and
m represents an integer of from 2 to 10,
preferably the radical R' represents $-CH_2-CH_2-$, $-(CH_2)_4-$ or

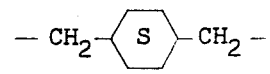

or a mixture thereof.

The preferred structural units c) are $C_4F_9SO_2-N(CH_2-CH_2-O-)_2$ or $C_8F_{17}SO_2-N(CH_2-CH_2-O-)_2$.

Within the context of this invention high molecular weight polyesters are polyesters which can be formed by a spinning process into filaments.

The flame-resistant polyesters according to the present invention are obtained by polycondensing a dicarboxylic acid with an alcoholic dihydroxy compound and a compound of the general formula

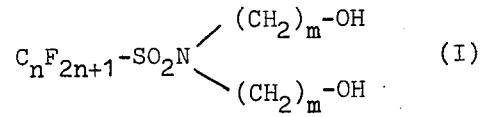

wherein
n represents an integer of from 1 to 10 and
m represents an integer of from 2 to 10,
wherein the compound of said general formula (I) is present in such quantities that the polyester contains from 0.1 to 15 percent by weight of a compound of said formula (I) incorporated by condensation.

The perfluorinated aliphatic sulphonamides of the general formula (I), which are to be incorporated in the polyesters as flame-retarding additives, have been described in Ann. 1973, Volume 1, pages 11 – 19.

The compounds
$C_4F_9SO_2N(CH_2CH_2OH)_2$ and
$C_8F_{17}SO_2N(CH_2CH_2OH)_2$
for example, have proved to be particularly suitable.

It has been found that, when these perfluorinated compounds corresponding to formula (I) are incorporated by polycondensation as flame-retarding agents, no elimination of hydrofluoric acid takes place when the polyesters are subsequently worked up, e.g. by the spinning process, into formed products, so that the properties of the products, e.g. fibres, are not deleteriously affected.

The perfluorinated aliphatic sulphonamides are suitable for incorporation, by condensation, in any technologically interesting high molecular weight linear polyesters which can be worked into formed products, in particular into filaments and fibres. The polyesters prepared from terephthalic acid and glycols, such as ethylene glycol, butane-1,4-diol or cyclohexane-1,4-dimethanol, are of particular interest in this connection. In these polyesters, the terephthalic acid may also be partly replaced by isophthalic acid. In the polyesters of the present invention, part of the structural units formed by the usual glycols is replaced by units of formula (II).

To prepare the polyesters of the present invention, the sulphonamide compounds, of formula (I), may be added either to the reaction mixture of dicarboxylic acid or their esters and glycols before esterification is carried out or, alternatively, they may be added before or during polycondensation. In most cases, it is advisable to add all the reactants together at the start of the reaction. Ester interchange and polycondensation may be carried out either batchwise or continuously.

The perfluorinated sulphonamides which contain two alcoholic OH groups are added in a sufficient quantity to impart the required degree of fire-resistance to the particular polyester. It has been found possible to add preferably quantities of perfluorinated sulphonamide which correspond to a proportion in the polyester of 0.1 to 15 percent by weight.

It has been found that, in most cases, quantities corresponding to a proportion in the polyester of 0.1 to 5 percent by weight have been found sufficient. In many cases, incorporation of even a few percent of the sulphonamide compound is adequate to provide the desired degree of flame-resistance. Polycondensation, with the addition of compounds of formula (I), may be carried out by conventional methods without any risk of liberation of hydrofluoric acid.

Polyesters produced in this way can also be worked up into formed products by conventional methods, for example the polyesters may be spun into filaments and fibres by the melt spinning process without any elimination of HF taking place.

Filaments and fibres manufactured in this way show high flame-resistance in the combustion test. The oxygen test employed in the examples is carried out as follows:

A sample is placed vertically into a combustion tube through which a gas mixture of oxygen and nitrogen flows at a specified rate, and the sample is ignited with a gas flame from above.

The ratio of nitrogen to oxygen is then varied until the sample burns uniformly with a minimum flame. The combustion coefficient (LOI index) — n — is calculated as follows:

$$n = \frac{\text{Litre of } O_2}{\text{Litre of } O_2 + \text{Litre of } N_2} \times 100$$

The higher the LOI index (proportion of oxygen) the lower is the combustibility of a substance.

The LOI index, "n," thus indicates the percentage of oxygen in the oxygen/nitrogen mixture just sufficient to enable a vertically placed sample to burn uniformly from the top downwards.

The following examples are to further illustrate the invention without limiting it.

EXAMPLE 1

An ester interchange catalyst (0.018 percent by weight, based on DMT, of zinc acetate = 1.08 g) is added to a mixture of 5.94 kg of dimethylterephthalate (DMT),
0.06 kg of $C_8F_{17}SO_2N(CH_2CH_2OH)_2$ and
6 liters of ethylene glycol.

The mixture is heated for 2 ¾ hours at temperatures rising from 180° to 220°C to effect ester interchange. 0.018 percent by weight of $GeO_2$ and 0.072 percent by weight of triphenylphosphate, based on DMT, are then added. Precondensation is then carried out by heating to 250°C for up to ¾ hour while a stream of nitrogen is passed through the reaction mixture. Polycondensation is carried out by heating at 275°C for 3 hours at diminishing pressures starting from 1 mm Hg.

The polyester obtained has the following properties:

| | |
|---|---|
| Melting point | 252°C |
| Melt viscosity, $\eta(280°C)$ | 3100 poises |
| Remission 460 $\mu$m | 73.8% |

The remission was determined by means of an Elrepho apparatus (manufactured by Zeiss), using barium sulphate as standard = 100 percent. The method is carried out as follows:

In the "Elrepho" apparatus the sample is irradiated by light having a wave length of 460 $\mu$m, and the light which is remitted by the sample is measured. This is compared to a sample of barium sulphate, the remission of which is defined to be 100 percent. If, for example, the remission is given to be 73.6 percent, then this means that compared to barium sulphate 73.6 percent of the light is remitted by the sample. The higher the percentage the "whiter" the sample.

The copolyester was drawn off at the rate of 1100 m/min at a screw temperature of 270°C (temperature at spinning head), to produce a yarn with a spinning titre of dtex 240/18 which was then stretched at the rate of 500 m/min to a stretching ratio of 1 : 3.6 (temperature of rollers 90°C, heating block temperature 140°C) so that the final titre was dtex 66/18.

A yarn with the following properties was obtained:

| | |
|---|---|
| Tensile strength | 38 Rkm (break-km) |
| Elongation on breaking | 42% |
| Boiling shrinkage | 7% |

The yarn obtained in this way was used for manufacturing stockings. These were tested by the oxygen test:
LOI test: $n = 33$.

A comparison test, using stockings manufactured from ordinary polyester yarn (polyethylene glycol terephthalate), gave the following result:
LOI test: $n = 28$.

EXAMPLE 2

77.6 kg of terephthalic acid (TPS) and 80 liters of ethylene glycol were esterified by heating for 3 hours at 250°C, (under a pressure of 4.5 excess atmospheres) in the presence of 0.02 percent by weight, based on TPS, of sodium acetate (16 g), and 3 percent by weight, based on TPS, of $C_4F_9SO_2N(CH_2CH_2OH)_2$ (2.4 kg). The pressure was then released (for approximately 15 minutes), after the addition of 0.02 percent by weight, based on TPS, of $GeO_2$(16g) in the form of a 5 percent by weight solution in ethylene glycol; nitrogen at 250°C was then passed over the melt for 15 minutes. Precondensation was carried out by heating at 250°C for 45 minutes and polycondensation was carried out by heating at 275°C for 3 ½ hours at diminishing pressures starting from 1 mm Hg. The polyester obtained had the following properties:

| | |
|---|---|
| Melting point | 246 – 248°C |
| Melt viscosity $\eta(280°C)$ | 2800 poises |
| Remission (determined as in Example 1) | 69.7% |

$C_4F_9SO_2N(CH_2CH_2OH)_2$ was also incorporated in proportions of 0.1%; 0.5% and 1% by weight, by a similar method.

| | Melting point | Remission (460 μm) | Melt viscosity $\eta 280$(poises) |
|---|---|---|---|
| 0.1% $C_4F_9SO_2N(CH_2CH_2OH)_2$ | 258° | 78.0% | 3000 |
| 0.5% | 254° | 76.5% | 3200 |
| 1.0% | 252° | 73.1% | 3100 |

The polyesters obtained in this way could be worked, in a similar way to that mentioned in Example 1, to produce filaments and yarns which were found to have good flame-resistance in oxygen test.

What we claim is:

1. A filament-forming high molecular weight linear polyester consisting essentially of the structural units a) 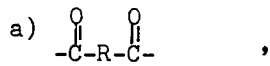

b) -O-R'-O- and c) 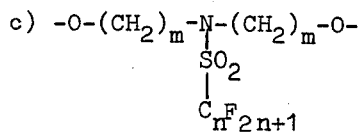

wherein the stoichiometric amount of said units b) and c) is equivalent to the stoichiometric amount of said units a, and wherein the amount of said units c) is 0.1 to 15 percent by weight of said polyester, and wherein R represents

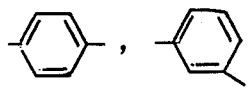

or a mixture thereof,

R' represents the radical of a glycol without the OH groups, n represents an integer of from 1 to 10 and m represents an integer of from 2 to 10.

2. The polyester of claim 1, wherein R' in said structural unit b) represents $-CH_2-CH_2-$, $-(CH_2)_4-$,

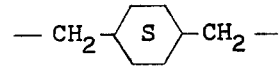

or a mixture thereof.

3. The polyester of claim 1, wherein said structural unit c) has the formula $C_4F_9SO_2-N(CH_2-CH_2-O-)_2$.

4. The polyester of claim 1, wherein said structural unit c) has the formula $C_8F_{17}SO_2-N(CH_2-CH_2-O-)_2$.

5. The polyester of claim 1, wherein the amount of said units c) is 0.1 to 5 percent by weight.

6. The polyester of claim 1, consisting essentially of the structural units a) 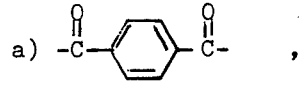, b) $-O-CH_2-CH_2-O-$ and c) $C_8F_{17}SO_2-N(CH_2-CH_2-O-)_2$.

7. The polyester of claim 1, consisting essentially of the structural units a) 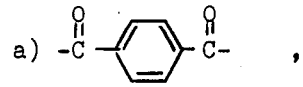, b) $-O-CH_2-CH_2-O-$ and c) $C_4F_9SO_2-N(CH_2-CH_2-O-)_2$.

8. Filaments and fibers consisting essentially of a polyester of claim 1.

* * * * *